(12) United States Patent
Albright

(10) Patent No.: US 12,472,375 B1
(45) Date of Patent: Nov. 18, 2025

(54) ROBOTIC DEVICE FOR PHOTOBIOMODULATION AND METHOD THEREOF

(71) Applicant: Richard Albright, Franklin, TN (US)

(72) Inventor: Richard Albright, Franklin, TN (US)

( * ) Notice: Subject to any disclaimer, the term of this patent is extended or adjusted under 35 U.S.C. 154(b) by 0 days.

(21) Appl. No.: 18/664,486

(22) Filed: May 15, 2024

(51) Int. Cl.
*A61N 5/06* (2006.01)
*A61N 5/067* (2006.01)
*B25J 15/00* (2006.01)

(52) U.S. Cl.
CPC ............. *A61N 5/062* (2013.01); *A61N 5/067* (2021.08); *B25J 15/0019* (2013.01); *A61N 2005/0626* (2013.01)

(58) Field of Classification Search
CPC .................... A61N 5/062; A61N 5/067; A61N 2005/0626; B25J 15/0019
USPC ............................................. 607/89
See application file for complete search history.

(56) References Cited

U.S. PATENT DOCUMENTS

2023/0255716 A1 * 8/2023 Mantri ................... A61B 90/06
600/587

* cited by examiner

*Primary Examiner* — Aaron F Roane
(74) *Attorney, Agent, or Firm* — The Rapacke Law Group, P.A.

(57) ABSTRACT

A robotic system including: a mobile platform configured to support a body of the robotic system; a diagnosis arm located on a front of the body of the robotic system for patient sensory data; and a treatment arm attached to the body of the robotic system for providing photobiomodulation therapy to areas of a patient; and a control module configured to process the patient sensory data acquired by the diagnosis arm and to control parameters of the biomodulation therapy provided by the treatment arm in real-time.

13 Claims, 5 Drawing Sheets

ROBOTIC DEVICE FOR PHOTOBIOMODULATION AND METHOD THEREOF

BACKGROUND

Photobiomodulation (PBM), also known as low-level laser therapy (LLLT), can induce cell proliferation and enhance stem cell differentiation. Laser therapy is a non-invasive method that contributes to pain relief and reduces inflammation, parallel to the enhanced healing and tissue repair processes. Addressing chronic pain and inflammation poses considerable healthcare challenges, often necessitating long-term treatment strategies with varying degrees of efficacy. Photobiomodulation (PBM) therapy has emerged as a promising non-invasive approach. However, its reliance on manual operation by healthcare professionals hampers accessibility, consistency, and scalability.

There are currently a variety of existing PBM systems that include LLLT therapy devices connected to visual displays. These systems may be used by a clinician or patients hold and manipulate the LLLT source probe to place it over certain areas of a patient. During an application of the head of the LLLT probe against an area of a patient, the clinician or patient must use at least one hand and position the head by another hand which makes it rather difficult and may result in the clinician or patient missing a target area and causing insufficient therapy to a patient.

For example, U.S. Pat. No. 10,821,296 to Nadia Ansari (hereinafter "Ansari Patent"). The Ansari Patent discloses systems and methods for treating neuropathic pain by using a photo biomodulation device in a handheld manner. A robotic arm is attached to a light-emitting device and controlled, using a visual display, to automatically position the light-emitting device over areas to be treated on the patient's body. The automated light delivery process allows a patient to treat large portions of her body in a hands-free manner. However, this system employs only a single robotic arm for light delivery and relies on a mobile device camera for capturing images.

As another example, CN Patent No. 111,167,026 to Qian Denglin (hereinafter "Denglin Patent"). The DenglinPatent discloses an invention that provides a robot assisted focused ultrasound treatment device and particularly relates to the technical field of ultrasound equipment. An inner cavity part of a mobile platform is provided with a robot control cabinet and power supply equipment; the upper plane of the mobile platform is connected with a robot arm base through bolts, and an upper computer is arranged on the upper plane of the mobile platform; a treatment head is connected with the front end surface of a robot arm through bolts; host control software of the upper computer can give a command to the control cabinet, and the control cabinet drives the robot arm to reach a designated focus position; the treatment head can scan image and position information of the focus part and feed the image and position information back to the host control software in real time; and the host control software can give a treatment command and calculate coordinate information of the robot arm according to the position information of the focus, and the control cabinet drives the robot arm to drive the treatment head to reach a treatment position. The robot assisted focused ultrasound treatment device can adapt to ultrasound treatment in different focus types; and meanwhile, the corresponding precision of ultrasound focus domain and the focus position is guaranteed by using the high precision characteristic of the robot. However, the system is focused on ultrasound treatment instead of photo biomodulation therapy using LLLT. Additionally, the system has only one robotic arm instead of a dual-arm system.

Disclosed herein is a system and method consisting of a dual-arm robotic apparatus designed to deliver photo biomodulation therapy with heightened precision and efficiency for alleviating pain and inflammation.

SUMMARY OF THE INVENTION

Briefly summarized, disclosed herein is a system and method consisting of a robotic apparatus designed to deliver photo biomodulation therapy with heightened precision and efficiency for alleviating pain and inflammation. The robotic device integrates a dual-arm system: one arm features sensors for real-time monitoring and assessment (Diagnostic Arm), while the other is equipped with a PBM laser module for treatment (Treatment Arm). Powered by intelligent algorithms, this device automates the PBM treatment process, offering a patient-centered, adaptive, and exceptionally effective therapeutic solution.

Also disclosed herein is a method of delivering photobiomodulation therapy via a robotic system includes activating the robotic system, the robotic system including: a mobile platform configured to support a body of the robotic system; a diagnosis arm located on a front of the body of the robotic system for patient sensory data; a treatment arm attached to the body of the robotic system for providing photobiomodulation therapy to areas of a patient; and a control module configured to process the patient sensory data acquired by the diagnosis arm and to control parameters of the biomodulation therapy provided by the treatment arm in real-time.

These and other features of the concepts provided herein will become more apparent to those of skill in the art in view of the accompanying drawings and following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

Figure 1:
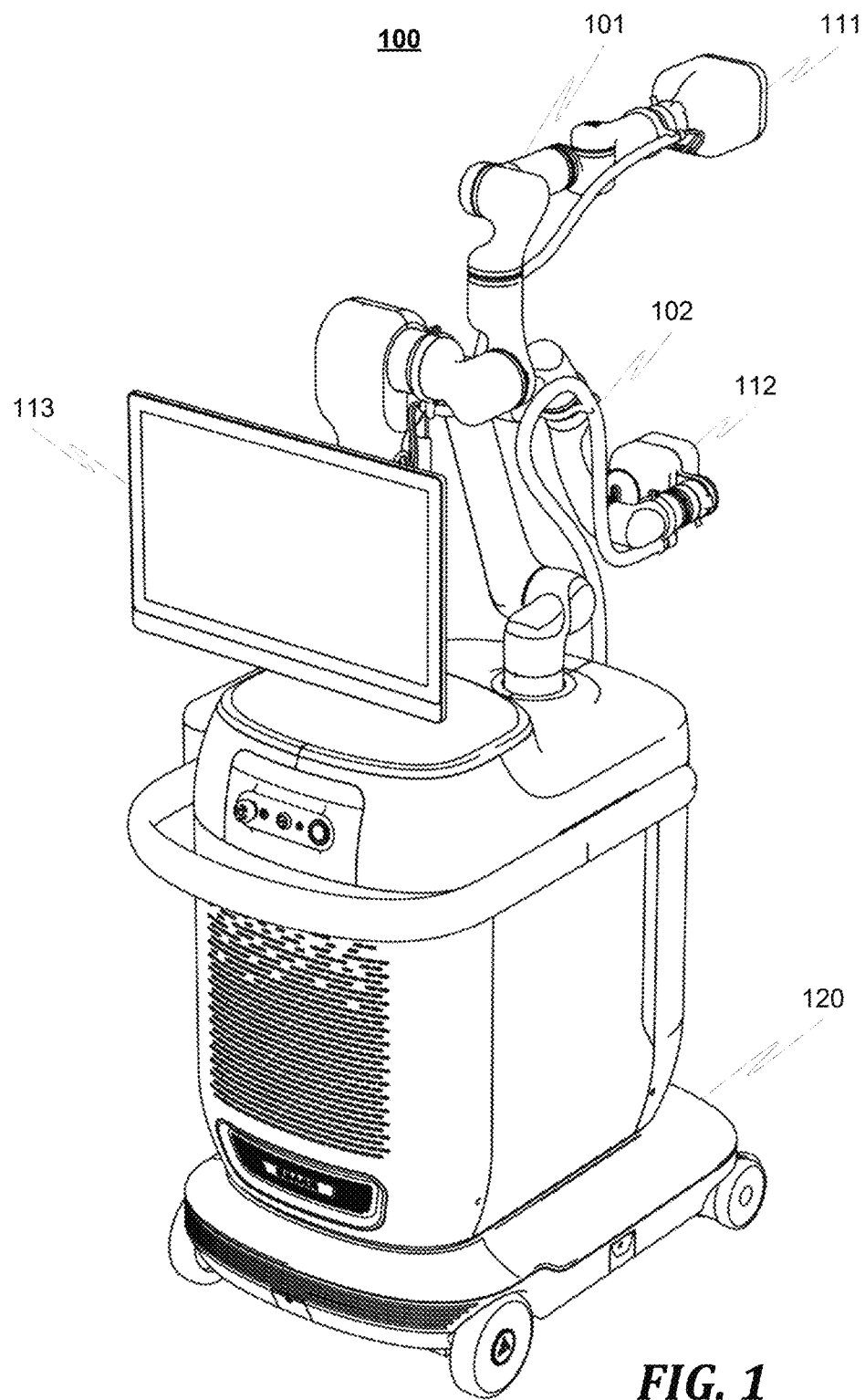
FIG. 1 provides a 3-D front view of a system consisting of a dual-arm robotic apparatus configured to deliver photobiomodulation therapy with heightened precision and efficiency, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

For clarity, it is to be understood that the word "distal" refers to a direction relatively closer to a patient on which a medical device is to be used as described herein, while the word "proximal" refers to a direction relatively further from the patient. Also, the words "including," "has," and "having," as used herein, including the claims, shall have the same meaning as the word "comprising."

Lastly, in the following description, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

Unless defined otherwise, all technical and scientific terms used herein have the same meaning as commonly understood by those of ordinary skill in the art.

Embodiments disclosed herein are directed to system and method related to a dual-arm robotic apparatus designed to deliver photobiomodulation therapy with heightened precision and efficiency for alleviating pain and inflammation in a patient.

According to the exemplary embodiments, the robotic device integrates a dual-arm system: one arm features sensors for real-time monitoring and assessment (Diagnostic Arm), while the other is equipped with a PBM laser module for treatment (Treatment Arm). Powered by intelligent algorithms (including AI-based algorithms), the disclosed device automates the PBM treatment process, offering a patient-centered, adaptive, and exceptionally effective therapeutic solution.

As discussed above, addressing chronic pain and inflammation poses considerable healthcare challenges, often necessitating long-term treatment strategies with varying degrees of efficacy. Advancements in robotics and laser therapy offer an opportunity to revolutionize this medical field, leading to the creation of an advanced therapeutic apparatus disclosed herein.

In one embodiment, the robotic device includes a mobile, adaptable base supporting two robotic arms. Engineered for effortless mobility and stability, the base ensures seamless operation in diverse treatment environments, spanning clinical facilities to home setups. The robotic device includes a Diagnostic Arm that houses sophisticated sensors capable of precise imaging and 3D mapping. The Diagnostic Arm may use infrared thermography, visible light imaging, and ultrasonic sensors for accurately accessing the treatment area.

Diagnostic Arm may contain a module for graphic projection imaging of the laser (visible or invisible near-infrared wavelengths). This is to assist the entire system to obtain more accurate position, distance and other key information. At the same time, it can be used to present the actual results of treatment trajectory planning to the doctor more intuitively, and to provide more accurate targets for the movement of the Treatment Arm in the process of treatment, so as to facilitate real-time correction of its movement position and targeting of key treatment points.

The Diagnostic Arm may pinpoint the specific area necessitating treatment while monitoring skin temperature to prevent overheating. The Diagnostic Arm may safeguard patient well-being by dynamically adjusting treatment parameters based on real-time feedback.

The disclosed the robotic device includes far-infrared thermal imaging module can not only monitor the temperature information in real-time during the treatment process to provide security. It is also capable of providing medical diagnostic grade thermography of the treatment area, including patients before and after treatment. It can help doctors to make medical diagnosis, evaluate the actual effect of treatment plan and make optimization adjustment.

In one embodiment, the robotic device includes a Treatment Arm that accommodates an advanced PBM laser module, finely adjustable to various wavelengths, power outputs, and pulsation modes in accordance with treatment protocols. The Treatment Arm is configured to hover precisely over the treatment site, maintaining optimal distance from the patient for energy delivery. The Treatment Arm is further configured to administer PBM therapy with precise dosage as per predetermined protocols, dynamically adapting for optimal therapeutic outcomes. The Treatment Arm may be extracted (or extended) to the treatment area, but automatically retracts to a non-treating position upon completing the therapy session (or if a safety notification is issued by the robotic control unit), signaling the conclusion or interruption of treatment.

Note that there are also numerous sensors located on the Treatment Arm, including but not limited to a near-field optical camera module and an ultrasonic ranging sensor. A similar module for graphic projection imaging of the laser as on the Diagnostic Arm may also be located on the Treatment Arm. The purpose of employing various sensors in the embodiments is to better detect, target, and safely monitor the local area being treated during the treatment process.

In one embodiment, the disclosed robotic system uses a sophisticated control system empowered with machine learning capabilities. The control system processes data from the Diagnostic Arm to map treatment areas and tailor treatment parameters. The control system orchestrates both arms to operate in perfect synchrony, ensuring a seamless and secure therapy session.

Referring to FIG. 1, a 3-D front view of a system consisting of a dual-arm robotic apparatus configured to deliver photobiomodulation therapy with heightened precision and efficiency is shown.

The robotic device 100 includes a mobile adaptable base 120 supporting two robotic arms. Engineered for effortless mobility and stability, the base 120 ensures seamless operation in diverse treatment environments, spanning clinical facilities to home setups. The robotic device 100 includes a Diagnostic Arm 101 that houses sophisticated sensors 111 capable of precise imaging and 3D mapping. The Diagnostic Arm 101 may use infrared thermography, visible light imaging, and ultrasonic sensors for accurately accessing the treatment area. The Diagnostic Arm 101 may pinpoint the specific area of a patient necessitating treatment while monitoring skin temperature to prevent overheating. The Diagnostic Arm 101 may safeguard the patient well-being by dynamically adjusting treatment parameters based on real-time feedback.

In one embodiment, the robotic device includes a Treatment Arm 102 that accommodates an advanced PBM laser module 112, finely adjustable to various wavelengths, power outputs, and pulsation modes in accordance with treatment protocols. The Treatment Arm 102 is configured to hover precisely over the treatment site, maintaining optimal distance from the patient for energy delivery. The Treatment Arm 102 is further configured to administer PBM therapy with precise dosage as per predetermined protocols, dynamically adapting for optimal therapeutic outcomes. The Treatment Arm 102 automatically retracts to a non-treating position upon completing the therapy session, signaling the conclusion of treatment.

In one embodiment, the disclosed robotic system 100 uses a sophisticated control system (not shown) empowered with machine learning capabilities. The control system processes data from the Diagnostic Arm 101 to map treatment areas and tailor treatment parameters. The control system orchestrates both arms 101 and 102 to operate in perfect synchrony, ensuring a seamless and secure therapy session. The robotic system 100 may also include an intuitive user interface 113 enabling practitioners to input specific treatment protocols, monitor therapy progress, and receive alerts for necessary adjustments or completion of the therapy.

Figure 2:
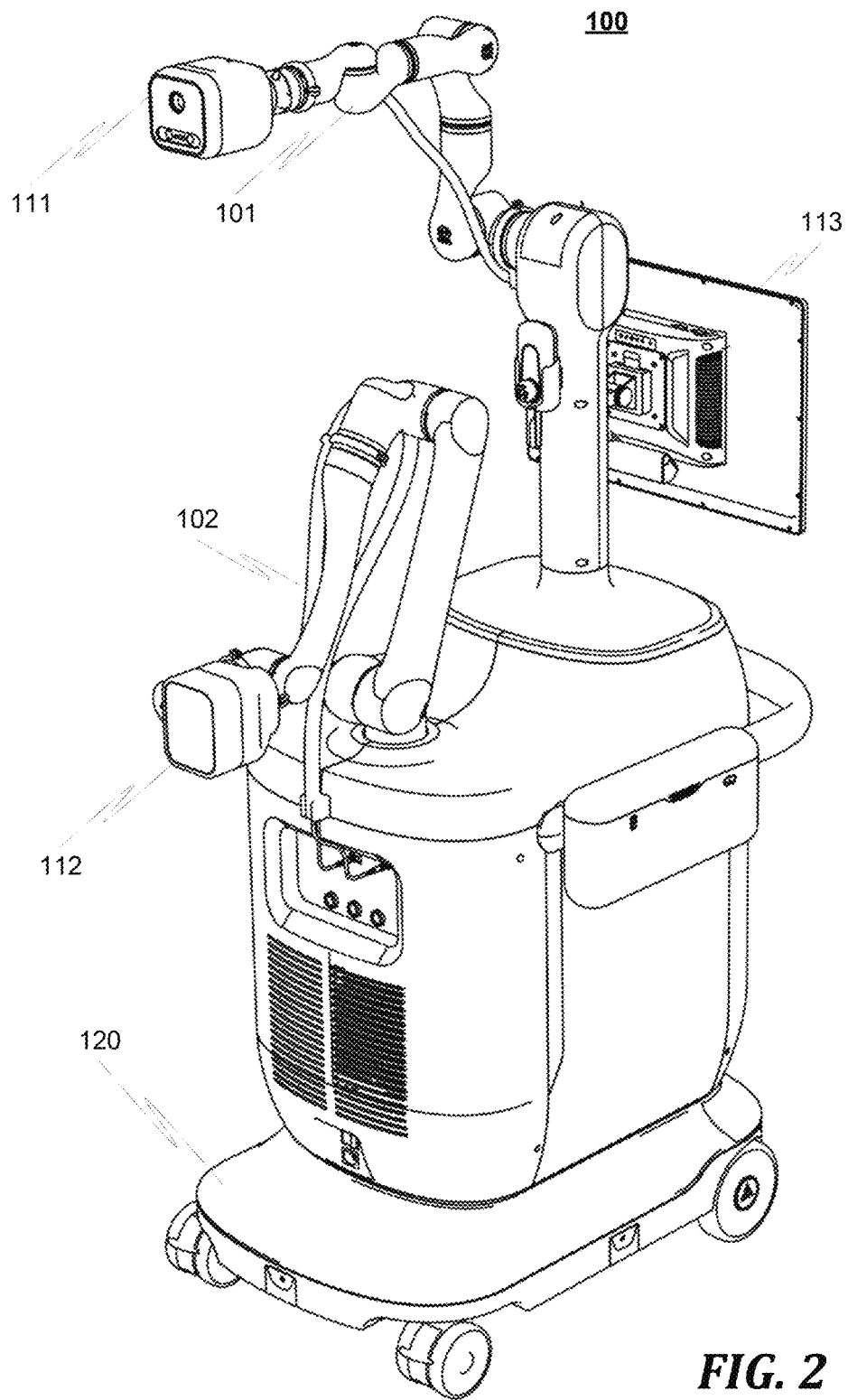
FIG. 2 provides a 3-D back view of the system consisting of a dual-arm robotic apparatus configured to deliver photobiomodulation therapy with heightened precision and efficiency, in accordance with some embodiments.

Referring to FIG. 2, a 3-D back view of a system consisting of a dual-arm robotic apparatus configured to deliver photobiomodulation therapy with heightened precision and efficiency is shown. As discussed with reference to FIG. 1, the robotic device 100 includes a mobile adaptable base 120 supporting two robotic arms. Engineered for effortless mobility and stability, the base 120 ensures seamless operation in diverse treatment environments, spanning clinical facilities to home setups. The robotic device 100 includes a Diagnostic Arm 101 that houses sophisticated sensors 111 capable of precise imaging and 3D mapping. The Diagnostic Arm 101 may use infrared thermography, visible light imaging, and ultrasonic sensors for accurately accessing the treatment area. The Diagnostic Arm 101 may pinpoint the specific area of a patient necessitating treatment while monitoring skin temperature to prevent overheating. The Diagnostic Arm 101 may safeguard the patient well-being by dynamically adjusting treatment parameters based on real-time feedback.

In one embodiment, the robotic device includes a Treatment Arm 102 that accommodates an advanced PBM laser module 112, finely adjustable to various wavelengths, power outputs, and pulsation modes in accordance with treatment protocols. The Treatment Arm 102 is configured to hover precisely over the treatment site, maintaining optimal distance from the patient for energy delivery. The Treatment Arm 102 is further configured to administer PBM therapy with precise dosage as per predetermined protocols, dynamically adapting for optimal therapeutic outcomes. The Treatment Arm 102 automatically retracts to a non-treating position upon completing the therapy session, signaling the conclusion of treatment.

In one embodiment, the disclosed robotic system 100 uses a sophisticated control system (not shown) empowered with machine learning capabilities. The control system processes data from the sensors of the Diagnostic Arm 101 to map treatment areas and tailor treatment parameters for the Treatment Arm 102. The control system orchestrates both arms 101 and 102 to operate in perfect synchrony, ensuring a seamless and secure therapy session. The robotic system 100 may also include an intuitive user interface 113 enabling practitioners to input specific treatment protocols, monitor therapy progress, and receive alerts for necessary adjustments or completion of the therapy. In one embodiment, the interface 113 enhances user interaction and convenience by providing a touchscreen panel on the device (or remotely) through a secure application.

In one embodiment, the disclosed robotic system 100 has multiple safety features. The robotic system 100 may provide emergency stop buttons accessible from various angles. In one embodiment, real-time skin temperature monitoring via sensors 111 of the Diagnostic Arm 101 may be implemented to prevent skin burns. An automatic retraction of the Treatment Arm 102 upon detecting unexpected movement within the treatment zone may be implemented based on motion sensor data received from the sensors 111 of the Diagnostic Arm 101. These features, advantageously, prioritize patient safety throughout the therapy session.

Figure 3:
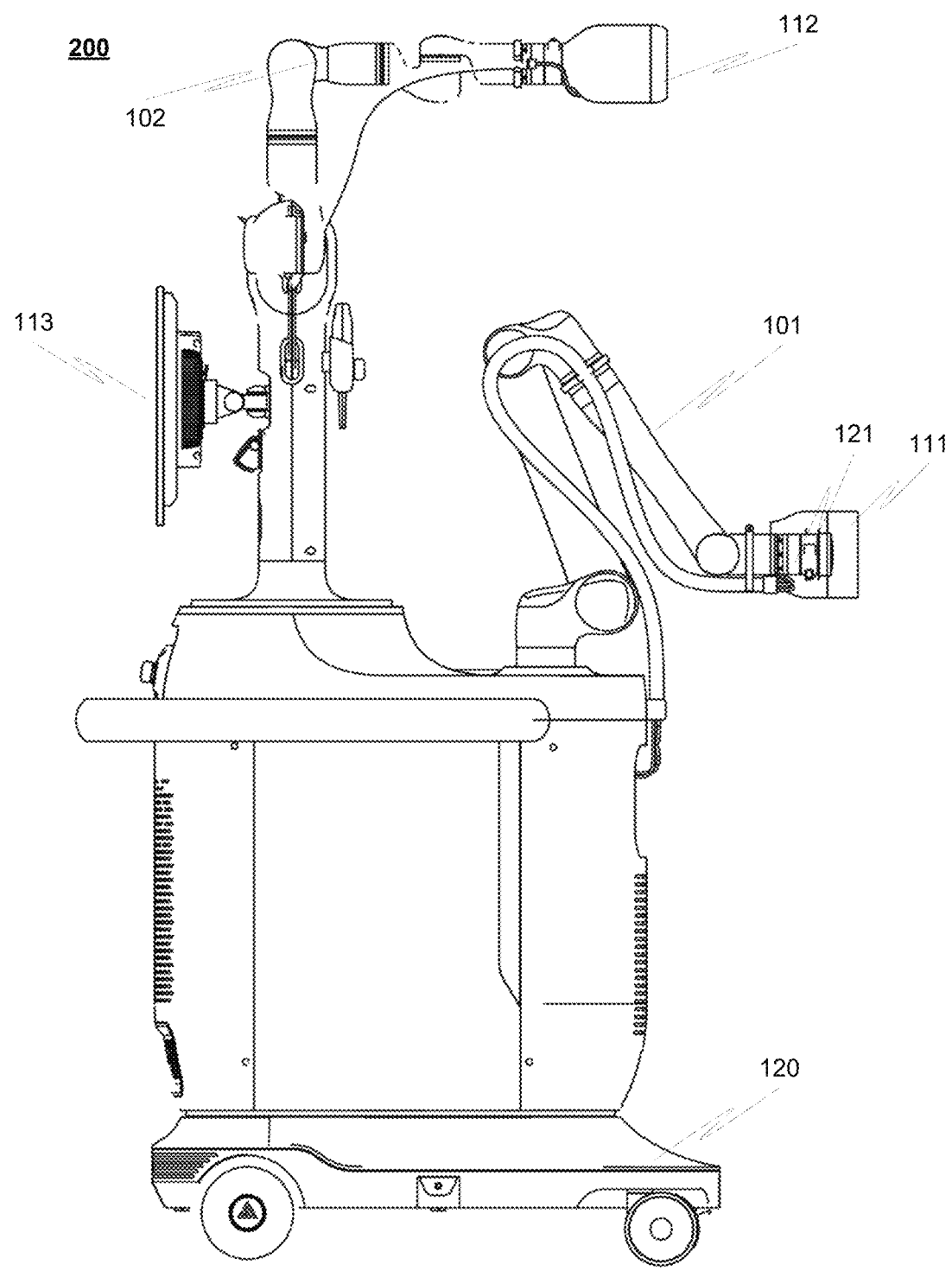
FIG. 3 provides a side view of the system consisting of a dual-arm robotic apparatus configured to deliver photobiomodulation therapy with heightened precision and efficiency, in accordance with some embodiments.

Referring to FIG. 3, a side view of a system consisting of a dual-arm robotic apparatus configured to deliver photobiomodulation therapy with heightened precision and efficiency is shown.

As discussed with reference to FIGS. 1 and 2, the robotic device 100 includes a mobile adaptable base 120 supporting two robotic arms. Engineered for effortless mobility and stability, the base 120 ensures seamless operation in diverse treatment environments, spanning clinical facilities to home setups. The robotic device 100 includes a Diagnostic Arm 101 that houses sophisticated sensors 111 capable of precise imaging and 3D mapping. The Diagnostic Arm 101 may use infrared thermography, visible light imaging, and ultrasonic sensors for accurately accessing the treatment area. The Diagnostic Arm 101 may pinpoint the specific area of a patient necessitating treatment while monitoring skin temperature to prevent overheating. The Diagnostic Arm 101 may safeguard the patient well-being by dynamically adjusting treatment parameters based on real-time feedback.

In one embodiment, the robotic device includes a Treatment Arm 102 that accommodates an advanced PBM laser module 112, finely adjustable to various wavelengths, power outputs, and pulsation modes in accordance with treatment protocols. The Treatment Arm 102 is configured to hover precisely over the treatment site, maintaining optimal distance from the patient for energy delivery. The Treatment Arm 102 is further configured to administer PBM therapy with precise dosage as per predetermined protocols, dynamically adapting for optimal therapeutic outcomes. The Treatment Arm 102 automatically retracts to a non-treating position upon completing the therapy session, signaling the conclusion of treatment.

In one embodiment, the disclosed robotic system 100 uses a sophisticated control system (not shown) empowered with machine learning capabilities. The control system processes data from the sensors of the Diagnostic Arm 101 to map treatment areas and tailor treatment parameters for the Treatment Arm 102. The control system orchestrates both arms 101 and 102 to operate in perfect synchrony, ensuring a seamless and secure therapy session. The robotic system 100 may also include an intuitive user interface 113 enabling practitioners to input specific treatment protocols, monitor therapy progress, and receive alerts for necessary adjustments or completion of the therapy. In one embodiment, the interface 113 enhances user interaction and convenience by providing a touchscreen panel on the device (or remotely) through a secure application.

In one embodiment, the disclosed robotic system 100 has multiple safety features. The robotic system 100 may provide emergency stop buttons accessible from various angles. In one embodiment, real-time skin temperature monitoring via sensors 111 of the Diagnostic Arm 101 may be implemented to prevent skin burns. An automatic retraction of the Treatment Arm 102 upon detecting unexpected movement within the treatment zone may be implemented based on motion sensor data received from the sensors 111 of the Diagnostic Arm 101.

The robotic system 100 utilizes a unique Dual-Collaborative-Robotic-Arms structure. One collaborative robotic arm (designated as the Treatment Arm 101) is outfitted with laser therapy end-effectors, including a laser collimator cylinder 121, alongside safety monitoring sensors such as distance sensing and near-field optical cameras (not numbered). The other robotic arm (referred to as the Auxiliary or Diagnosis Arm 102) is equipped with a scene-sensing and monitoring module 111 comprising a 3-D depth camera module and a far-infrared thermal imaging module (not numbered).

In exemplary use case, therapists simply input the targeted body part and the corresponding medical condition for treatment into the interface 113. Subsequently, the device's control unit autonomously devises the treatment trajectory, including manipulation techniques and spot movement speed, and generates the treatment parameters plan (treatment protocol) through artificial intelligence (AI) vision processing utilizing information acquired from the scene perception and monitoring module of the Diagnosis Arm 102, in conjunction with pre-established expert physiotherapy treatment plans retrieved from a local on device storage or from a remote cloud database. AI-based predictive processing may employ stored patients' biomodulation therapy data including previous parameters of the biomodulation therapy. The therapists may have an option to review and refine the protocol before authorizing the robotic system 100 to conduct the entire treatment process autonomously.

Throughout the treatment session, besides the sensors 112 located at the end of the Treatment Arm 102, the scene perception and monitoring module on the Diagnostic Arm 101 continuously monitors the entire treatment process in real-time. This approach, advantageously, provides for real-time safety alerts and automatically initiates corresponding safety measures based on changes in distance, temperature, and presence of objects within the treatment area, as well as the posture and movements of patients or other entities.

The robotic system 100, according to the disclosed embodiments, advantageously, enables the therapists to concentrate more on patient diagnosis and protocol optimization based on patient feedback post-treatment, freeing them from treatment-associated repetitive tasks. This simplifies therapist operations, enhances treatment processes, and improves treatment out comes.

The robotic system 100 standardizes and quantifies the laser therapy process, reducing the technical barriers for the therapists. High-quality expert programs and techniques become more accessible to a wider patient population, and continuous optimization is facilitated through extensive clinical feedback to enhance treatment efficacy. The robotic system 100 further enhances the safety of the laser therapy process by assisting in continuous monitoring throughout treatment, mitigating risks associated with therapist fatigue and distractions. This reduces the therapists' workloads and enhances efficiency.

Figure 4:
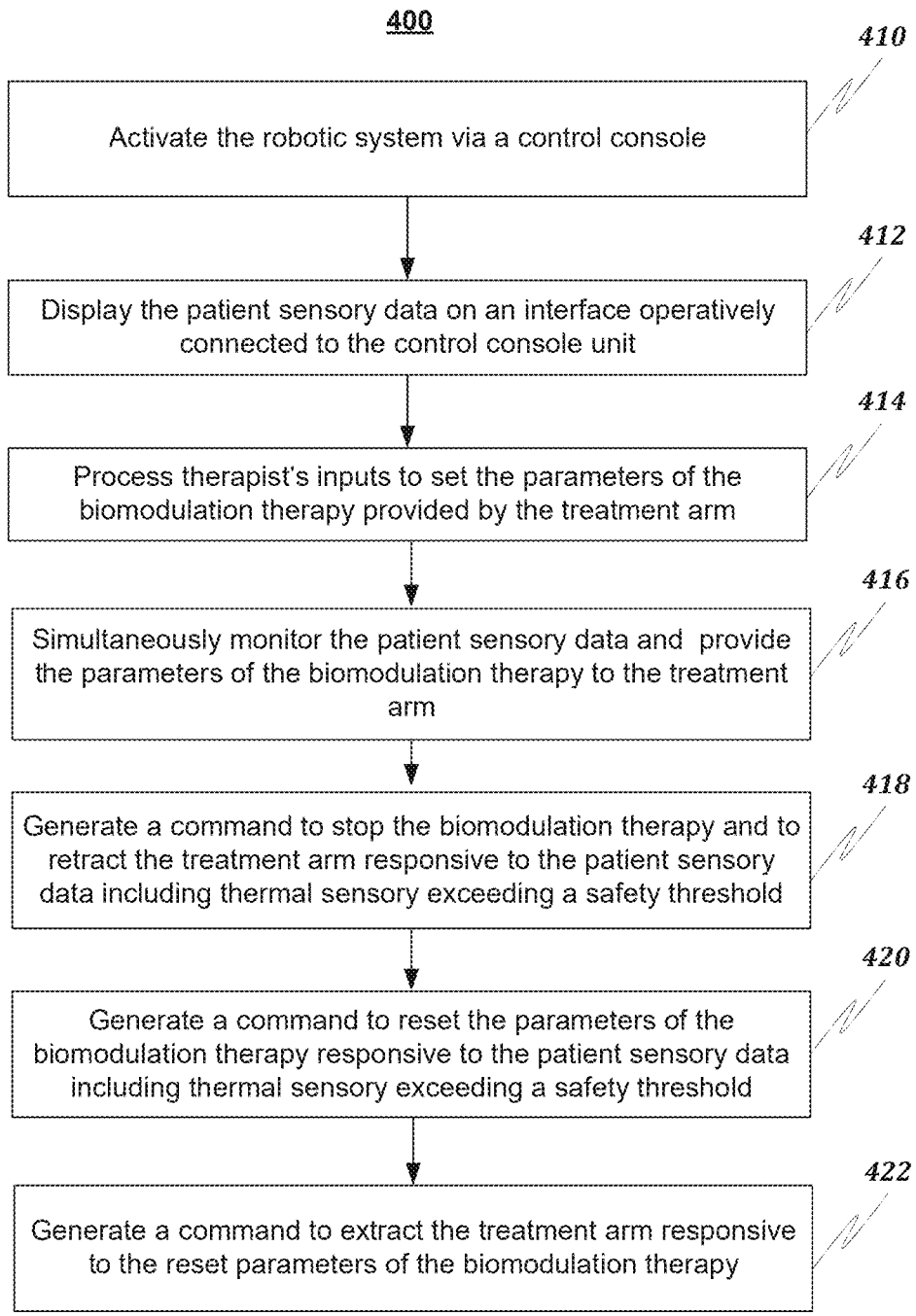
FIG. 4 provides a flowchart of a method for delivery of a photobiomodulation therapy with heightened precision and efficiency, in accordance with some embodiments.

FIG. 4 provides a flowchart of a method for delivery of a photobiomodulation therapy with heightened precision and efficiency, in accordance with some embodiments.

Referring to FIG. 4, the method for method for delivery of a photobiomodulation therapy is implemented using the robotic system 100 described above. At block 410, the robotic system may be activated via a control console. The robotic system including: a mobile platform configured to support a body of the robotic system; a diagnosis arm located on a front of the body of the robotic system for patient sensory data; and a treatment arm attached to the body of the robotic system for providing photobiomodulation therapy to areas of a patient; a control module configured to process the patient sensory data acquired by the diagnosis arm and to control parameters of the biomodulation therapy provided by the treatment arm in real-time.

At block 412, the control console may display the patient sensory data on an interface operatively connected to the control console unit. At block 414, the control console may process therapist's inputs to set the parameters of the biomodulation therapy provided by the treatment arm. At block 416, the control console may simultaneously monitor the patient sensory data and may provide the parameters of the biomodulation therapy to the treatment arm. At block 418, the control console may generate a command to stop the biomodulation therapy and to retract the treatment arm responsive to the patient sensory data including thermal sensory exceeding a safety threshold.

At block 420, the control console may generate a command to reset the parameters of the biomodulation therapy responsive to the patient sensory data including thermal sensory exceeding a safety threshold. At block 422, the control console may generate a command to extract the treatment arm responsive to the reset parameters of the biomodulation therapy.

Figure 5:
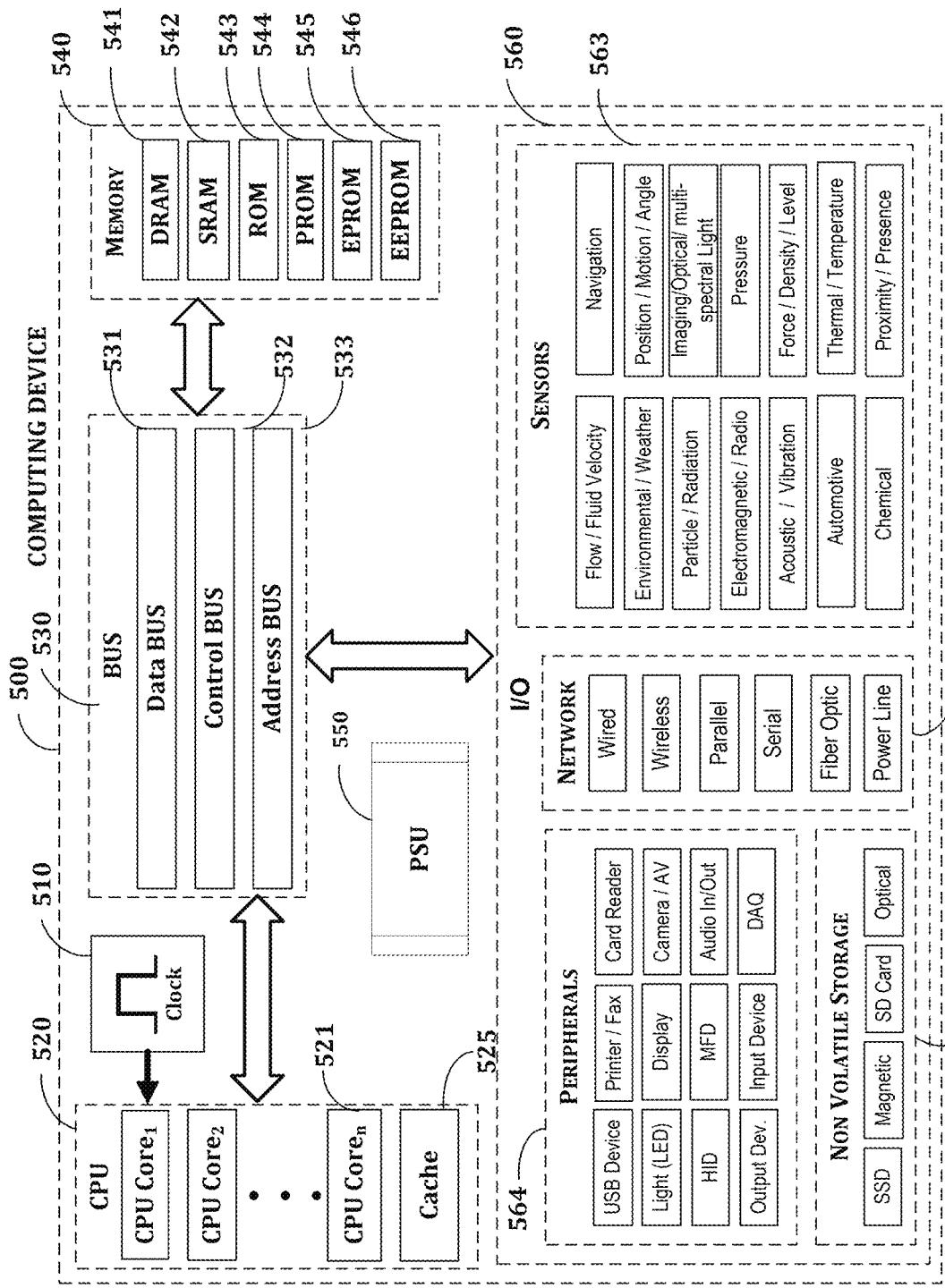
FIG. 5 provides a block diagram of a computer console used in the dual-arm robotic system in accordance with some embodiments.

FIG. 5 illustrates a block diagram of a system including a computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures. A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (TSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

- Internal data bus (data bus) 531/Memory bus
- Control bus 532
- Address bus 533
- System Management Bus (SMBus)
- Front-Side-Bus (FSB)
- External Bus Interface (EBI)
- Local bus
- Expansion bus
- Lightning bus
- Controller Area Network (CAN bus)
- Camera Link
- ExpressCard
- Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
- Small Computer System Interface (SCSI)/Serial Attached SCSI (SAS)
- HyperTransport
- InfiniBand
- RapidIO
- Mobile Industry Processor Interface (MIPI)
- Coherent Processor Interface (CAPI)
- Plug-n-play
- 1-Wire
- Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
- Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
- Music Instrument Digital Interface (MIDI)
- Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPV6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, sensors, airbag brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/ resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to, microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A robotic system for delivering photobiomodulation therapy, comprising:
a mobile platform configured to support a body of the robotic system;
a diagnosis arm located on a front of the body of the robotic system for acquiring patient sensory data using one or more imaging or thermal sensors; and
a treatment arm attached to the body of the robotic system for delivering photobiomodulation therapy using a PBM laser module to a target treatment site on the patient;
a control module configured to process the patient sensory data acquired by the diagnosis arm and to control parameters of the biomodulation therapy provided by the treatment arm in real-time, wherein the control module dynamically adjusts the therapy parameters based on AI-driven analysis of the sensory data including thermal thresholds, and generates safety commands including retraction of the treatment arm upon detecting patient safety risks.

2. The robotic system of claim 1, wherein the control module is operatively connected to an interface device configured to display the patient sensory data acquired by sensors of the diagnosis arm.

3. The robotic system of claim 2, wherein the interface devi is configured to receive therapist's inputs and provide the inputs to the control module.

4. The robotic system of claim 3, wherein the control module is configured to generate the parameters of the biomodulation therapy to be provided by the treatment arm.

5. The robotic system of claim 1, wherein the control module is configured to simultaneously monitor the patient sensory data and provide the parameters of the biomodulation therapy to the treatment arm generated based on the patient sensory data.

6. The robotic system of claim 5, wherein the control module is configured to generate a command to stop the biomodulation therapy and retract the treatment arm responsive to the patient sensory data comprising thermal sensory data exceeding a safety threshold.

7. The robotic system of claim 6, wherein the control module is configured to generate a command to reset the parameters of the biomodulation therapy responsive to the patient sensory data comprising thermal sensory data exceeding a safety threshold.

8. The robotic system of claim 6, wherein the control module is configured to generate a command to extract the treatment arm responsive to the reset of the parameters of the biomodulation therapy.

9. The robotic system of claim 1, wherein the treatments arm comprises a PBM laser module.

10. The robotic system of claim 1, wherein the control module is configured to execute intelligence algorithms based on the patient sensory data and stored patients' biomodulation therapy data.

11. The robotic system of claim 10, wherein the control module is configured to execute intelligence algorithms comprising AI-based predictive processing employing stored patients' biomodulation therapy data comprising previous parameters of the biomodulation therapy.

12. The robotic system of claim 11, wherein the control module is configured to execute intelligence algorithms configure to generate safety alerts to the interface device and to recalculate the parameters of the biomodulation therapy based on thermal sensory data acquired by thermal sensors of the diagnostic arm.

13. A dual-arm robotic system for delivering photobiomodulation therapy, comprising:
   a control console configured for orchestration of robotic operations of dual-arms; and
   a mobile platform configured to support a body of the dual-arm robotic system;
   a diagnosis arm located on a front of the body of the robotic system for acquisition of patient sensory data via at least one of a 3D imaging module, infrared thermography, or ultrasonic sensors; and
   a treatment arm attached to the body of the robotic system for administering photobiomodulation therapy using a PBM laser module configured for real-time wavelength, power, and dosage modulation,
   wherein the control console processes the patient sensory data acquired by the diagnosis arm and generates parameters of the biomodulation therapy to be provided by the treatment arm in real-time based on the patient sensory data, and further executes artificial intelligence algorithms to dynamically adapt treatment parameters and initiate safety protocols including automatic retraction of the treatment arm upon detecting thermal or positional anomalies.

* * * * *